Feb. 24, 1970     J. COMO     3,496,618

TIRE GROOVING AND SKIVING CUTTER

Filed Dec. 20, 1966

INVENTOR:
JOSEPH COMO
By: *Jerry B. Cesak*

United States Patent Office 3,496,618
Patented Feb. 24, 1970

3,496,618
TIRE GROOVING AND SKIVING CUTTER
Joseph Como, Vancouver, British Columbia, Canada (5190 Cambridge St., North Burnaby, British Columbia, Canada)
Filed Dec. 20, 1966, Ser. No. 605,526
Int. Cl. B26d 1/00
U.S. Cl. 29—103            1 Claim

ABSTRACT OF THE DISCLOSURE

A rotatable circular disc having a flat main body portion with a marginal rim portion angularly offset to one side of the plane of the body portion. The rim portion is provided with right-angular notches each having a sharp leading edge tangential to the main body portion, and an unsharpened trailing edge extending radially outwardly from the main body portion. Regions of the rim portion between the notches have sharp circumferential edges.

---

This invention relates to new and useful improvements in rotary cutters, and the principal object of the invention is to provide a circular cutter which is especially adapted for efficient grooving and skiving of rubber tires during repairing of the same.

The invention will be understood from the following description taken in conjunction with the accompanying drawing, wherein like characters of reference designate like parts, and wherein.

Figure 1:
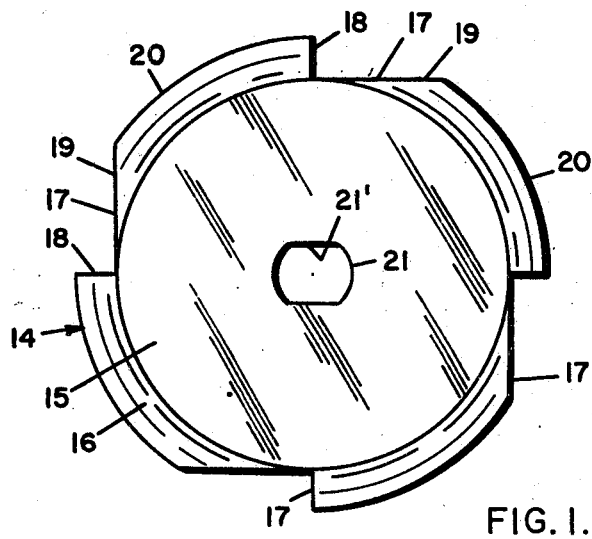
FIG. 1 is a plan view of the cutter in accordance with the invention.
Figure 2:
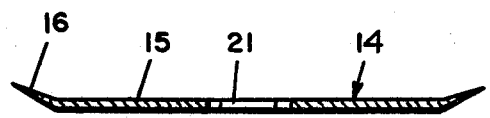
FIG. 2 is a cross-sectional view thereof.

Referring now to the accompanying drawings in detail, the rotary tire grooving and skiving cutter of the invention comprises a circular disc 13 having a flat main body portion 15 and a marginal rim portion 16 which is angularly offset to one side of the plane of the main body portion 15. The rim portion 16 is provided at circumferentially spaced points with a plurality of right-angular notches 17, each defined by a sharpened edge 19 which is tangential to the main body portion 15, and by an unsharpened edge 18 which extends radially outwardly from the main body portion. Regions of the rim portion 16 between the notches are provided with sharpened outer circumferential edges 20 which extend from the edge 19 of each notch to the edge 18 of the next.

Figure 3:
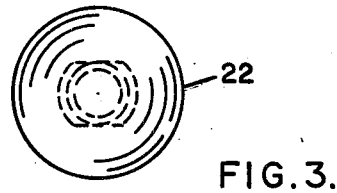
FIG. 3 is a head end view of a rotatable drive member for the cutter.
Figure 4:
FIG. 4 is a side elevational view of the drive member.
Figure 5:
FIG. 5 is a side elevational view of the drive member nut.

The main body portion 15 of the cutter disc is provided with a central aperture 21 which has flat edge portions 21' for driving engagement by a complementally shaped drive member 22 shown in FIGS. 3 and 4, on which the disc may be secured by a nut 23 shown in FIG. 5. The drive member is adapted to be attached to any suitable conventional power tool (not shown), such as for example a portable electric drill, for imparting rotation to the cutter disc.

Having thus described the invention, what is claimed:

1. A rotary cutter especially adapted for grooving and skiving of rubber tires, said cutter comprising a circular disc provided at its center with an aperture for drivingly mountng the disc on a rotatable drive member, said disc including a flat main body portion and a marginal rim portion which is angularly offset to one side of the plane of said main body portion, said rim portion being provided at circumferentially spaced points with a plurality of right-angular notches each defined by a sharpened edge which is tangential to the main body portion and by an unsharpened edge which extends radially outwardly from the main body portion, regions of said rim portion between said notches being provided with sharpened outer circumferential edges which extend from the sharpened edge of each notch to the unsharpened edge of the next.

References Cited

UNITED STATES PATENTS

| 139,176   | 5/1873 | Miller    | 83—676    |
| 1,629,830 | 5/1927 | Lyons     | 83—470 X  |
| 1,747,264 | 2/1930 | Rearick   | 30—347 X  |
| 1,846,020 | 2/1932 | Bangser   | 30—347 X  |
| 3,078,573 | 2/1963 | Kern      | 30—347    |
| 3,082,524 | 3/1963 | Schaeffer | 30—347    |
| 3,308,703 | 4/1967 | Sauer     | 83—676    |

HARRISON L. HINSON, Primary Examiner

U.S. Cl. X.R.
30—347; 83—676